Jan. 26, 1926.  
W. ZIPPER  
1,570,816  
DIVIDED RIM FOR AUTOMOBILE WHEELS  
Filed Dec. 12, 1924

Patented Jan. 26, 1926.

1,570,816

UNITED STATES PATENT OFFICE.

WALTER ZIPPER, OF VIENNA, AUSTRIA.

DIVIDED RIM FOR AUTOMOBILE WHEELS.

Application filed December 12, 1924. Serial No. 755,525.

*To all whom it may concern:*

Be it known that I, WALTER ZIPPER, engineer, a citizen of Austria, and residing at Hietzinger Hauptstrasse 120ª, Vienna, XIII, Austria, have invented certain new and useful Improvements in Divided Rims for Automobile Wheels, and of which the following is a specification.

The manipulations required with the known types of divisible felloes are inconvenient, take too much time and are difficult, as the parts to be separated are practically always very much covered with dust and mud. In particular, the slots of the bayonet joint become filled up with mud and have to be carefully cleaned before taking the rim members apart.

The present invention relates to a rim with a removable flange, whereby the drawbacks referred to above are completely obviated and a much quicker releasing and connecting of the rim parts is rendered possible.

The object of the invention is to construct and actuate the locking member in such a manner that the connecting and releasing of the rim members do not cause any more trouble or take up any more time than the fastening and unfastening of a lock. With this end in view the locking member for the connecting hooks secured in a circle to the detachable rim flange is constructed as a flat ring rotatable about the axis of the wheel and provided with marginal notches for the connecting hooks, and is equipped with a set of teeth, with which a toothed wheel engages, the shaft of which terminates in a pin or stud adapted to be rotated by means of a wrench or the like.

Figure 1:
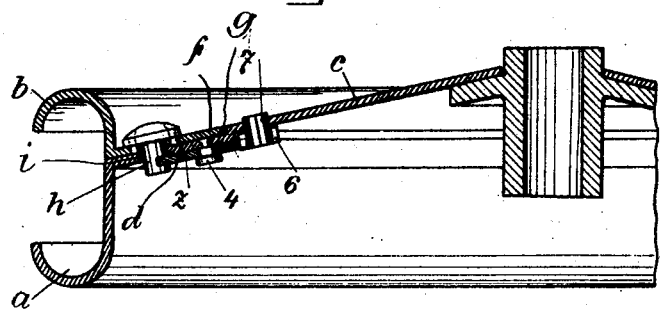
Figure 2:
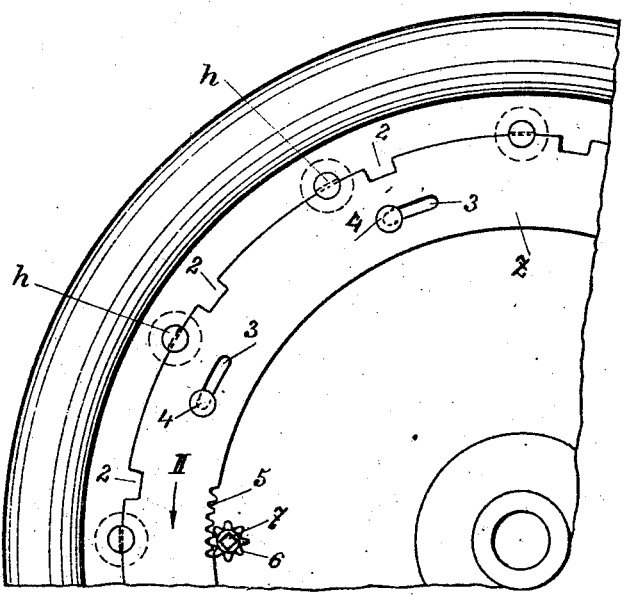

The accompanying drawing illustrates the invention as applied to a solid disc wheel, wherein one part of the rim is constructed as a projection from the wheel disc. Figures 1 and 2 show in radial section and in elevation respectively one constructional example of the connecting of the two parts of the rim.

The non-removable wider rim part $a$ is made in one piece with a solid disc wheel $c$.

The removable rim part $b$ is provided with a ring flange $f$, which is parallel to the outer part $d$ of the solid disc $c$ and lies in an annular joggled part of the disc $c$. With its inner edge the rim part $b$ bears against an annular step $g$ on the solid disc $c$.

The part $d$ of the solid disc $c$ and the ring flange $f$ carry the members serving for connecting the rim parts $a$, $b$.

To the flange $f$ of the detachable rim member $b$ are secured hooks $h$ arranged in a circle, which engage through apertures $i$ in the part $d$ of the wheel disc $c$, and project on the inner side of the wheel.

As a locking member for all the hooks $h$ there serves a flat ring $z$, which is provided at its periphery with notches 2 corresponding to the hooks $h$. This ring $z$ is provided with a few arcuate slots 3, through which pass headed bolts 4, which are inserted in the wheel disc $c$. The ring $z$ can be rotated to the extent of the length of the slots 3 in the direction of the arrow II (Figure 2). In the position illustrated in Figure 2 the ring $z$ locks all the hooks $h$ and thereby connects the rim parts $a$ and $b$ rigidly with one another. If the ring $z$ is rotated to the extent of the length of the slot 3, the rim part $b$ can be detached. To enable the ring $z$ to be rotated it is provided on its inner edge with a few teeth 5, in which gears a small toothed pinion 6, which is journalled in the wheel disc $c$. The shaft 7 of this toothed wheel 6 is rectangular in shape and projects on the outside of the wheel, so that it can be rotated by means of a socket wrench.

In consequence of the great velocity ratio between the small toothed wheel 6 and the teeth 5 the expenditure of force necessary for actuating the device is very small. Owing to the fact that instead of the closed bayonet slots that are employed in known divided rims there are the hooks $h$ and the open marginal recesses 2, dried mud is prevented from hampering the displacement of the parts to be disengaged.

What I claim is:—

A wheel rim with a detachable flange, comprising connecting hooks arranged in a circle on said flange, the non-detachable rim part being formed with apertures through which said connecting hooks project, a single ring rotatably secured to the non-detachable rim part to act as a locking organ for all the hooks, the said ring being formed with marginal recesses corresponding to the connecting hooks and with gear teeth, and a toothed pinion meshing with said gear teeth, said pinion being adapted to be rotated by means of a wrench.

In testimony whereof I have signed my name to this specification.

WALTER ZIPPER.